United States Patent [19]

Yamamoto et al.

[11] Patent Number: 5,561,206
[45] Date of Patent: Oct. 1, 1996

[54] ELECTROCHROMIC COPOLYMERS INCLUDING VINYL ALCOHOL OR VINYL ACETATE UNITS

[75] Inventors: Takakazu Yamamoto, 4-26-18, Edaminami Midori-ku, Yokohama-shi, Kanagawa-ken; Masaki Wakabayashi, Kurobe, both of Japan

[73] Assignees: Yoshida Kogyo K.K., Tokyo; Takakazu Yamamoto, Kanagawa-ken, both of Japan

[21] Appl. No.: 416,458

[22] Filed: Apr. 3, 1995

Related U.S. Application Data

[63] Continuation of Ser. No. 128,196, Sep. 29, 1993, abandoned.

[30] Foreign Application Priority Data

Oct. 1, 1992 [JP] Japan ..................... 4-284914

[51] Int. Cl.$^6$ ......................... C08F 228/06; C08F 218/04
[52] U.S. Cl. .............................. 526/256; 525/60; 526/331
[58] Field of Search ..................... 525/60, 284; 526/256, 526/330, 331

[56] References Cited

U.S. PATENT DOCUMENTS 5,243,004  9/1993  Funatsu ................................. 526/256

FOREIGN PATENT DOCUMENTS

| 00329916253 | 12/1980 | European Pat. Off. . |
| 0180082 | 10/1985 | European Pat. Off. . |
| 51-146253 | 12/1976 | Japan . |
| 52-46098 | 11/1977 | Japan . |
| 54-41756 | 4/1979 | Japan . |
| 56-67881 | 6/1981 | Japan . |
| 60-188931 | 9/1985 | Japan . |
| 4-108784 | 4/1992 | Japan . |

OTHER PUBLICATIONS

*Perspective in Polymer Science*, Interscience Publishers, pp. 175, 181 (1966).
*Preparation of Polymer Electrochromic Materials*, Chemical Abstracts, vol. 113, No. 16, Abstract No. 133478, p. 49, col. 1, (1990).

*Primary Examiner*—Christopher Henderson
*Attorney, Agent, or Firm*—Hill, Steadman & Simpson

[57] ABSTRACT

Disclosed is a copolymer represented by the following general formula (1):

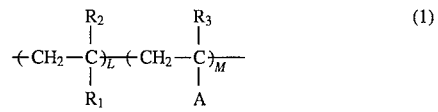

wherein $R_1$ represents a group based on a polymer or a copolymer possessing electroconductivity and inducing coloration or discoloration on being oxidized or reduced, $R_2$ and $R_3$ represent independently a hydrogen atom or an alkyl group having 1 to 1,000 carbon atoms, A represents a group possessing polarity and exhibiting affinity for ions, and L and M are independently an integer of at least 1, providing that the total degree of polymerization is an integer in the range of 10 to 12,000. The copolymer may be a block copolymer or a random copolymer. This copolymer exhibits electrochromism and, therefore, is useful as a coloring-discoloring material which induces coloration or discoloration on being oxidized or reduced, particularly as an electrochromic substance used in an electrochromic display device.

8 Claims, 2 Drawing Sheets

ELECTROCHROMIC COPOLYMERS INCLUDING VINYL ALCOHOL OR VINYL ACETATE UNITS

CROSS-REFERENCE TO RELATED APPLICATIONS

This application is a Continuation of prior application Ser. No. 08/128,196, filed Sep. 29, 1993, abandoned.

BACKGROUND OF THE INVENTION

1. Field of the Invention

This invention relates to novel copolymers exhibiting electrochromism and methods for the production thereof. This invention further relates to a coloring-discoloring material resorting to electrochromism, which is particularly usable in an electrochromic display device.

2. Description of the Prior Art

The term "electrochromism" refers to the phenomenon of a reversible change in color or the transmittance of light caused by the oxidation-reduction reaction occurring on the surface or in the neighborhood of an electrode in response to the application of voltage thereto, for example. Various materials have been reported as electrochromic substances which exhibit this phenomenon of electrochromism.

The heretofore known coloring materials capable of inducing electrochromism include those which use metal oxides like tungsten oxide as disclosed in Japanese Patent Publication No. SHO 52-46098, those which use organic low-molecular weight compounds like viologen in the form of a solution as disclosed in published Japanese Patent Application, KOKAI (Early Publication) No. SHO 51-146253, and those which use electroconductive macromolecular compounds having conjugated double bonds in the main chain thereof as disclosed in published Japanese Patent Application, KOKAI No. SHO 56-67881, for example.

Of the conventional coloring materials resorting to electrochromism, the metal oxides are produced by a vacuum process such as sputtering as disclosed in published Japanese Patent Application, KOKAI No. SHO 54-41756 and, therefore, have a problem of difficulty encountered in coating a large surface area with the metal oxide. In the case of the organic low-molecular weight compounds, the production of an electrochromic display device with such an organic low-molecular weight compound, as disclosed in published Japanese Patent Application, KOKAI No. SHO 51-146253, needs interposition of a diaphragm made of a semipermeable membrane between an electrode plate and a transparent electrode plate and further presence of a solution containing an organic low-molecular weight compound like viologen and a supporting electrolyte between the transparent electrode plate and the diaphragm and, therefore, is handicapped by the inevitable complication of the electrochromic display device in construction.

Then, in the case of the electroconductive macromolecular compounds having conjugated double bonds in the main chain thereof, the polymerization of such a compound is effected directly on the surface of an electrode by the electrolytic polymerization technique, for example, as disclosed in published Japanese Patent Application, KOKAI No. SHO 60-188931. Thus, it is difficult to coat inexpensively the electrode of a large surface area with the polymer. Further, of the electroconductive macromolecular compounds having conjugated double bonds in the main chain thereof, those which are soluble in a solvent are generally non-polar and, therefore, are deficient in adhesion to an electrode which by nature has a polar surface. These electroconductive macromolecular compounds, therefore, fail to produce fast adhesion to the electrode and still suffer from a problem of layer separation.

Particularly when the production of a solid type electrochromic display device by the use of an electroconductive macromolecular compound having conjugated double bonds in the main chain thereof and a macromolecular solid electrolyte is contemplated, the adhesiveness of the macromolecular compound to the macromolecular solid electrolyte poses a problem. In the produced device, the portions of inferior adhesion inhibit ionic conduction and form defective sites in the process of coloration and discoloration. In case there the adhesion is insufficient, the produced device after protracted use develops layer separation in consequence of repetition of the cycle of generation and extinction of color, change in temperature, or the like and the portions affected by the layer separation constitute themselves defective sites in the process of coloration and discoloration.

As respects the copolymerization of the kind contemplated and disclosed by the present invention, a polymer having a thiophene oligomer in the side chain thereof is disclosed in published Japanese Patent Application, KOKAI No. HEI 4-108784. Though this polymer is notably improved in solubility, it lacks polarity and still suffers from a problem of inferior adhesion.

SUMMARY OF THE INVENTION

The present invention, therefore, has an object of providing an electrochromic macromolecular substance exhibiting solubility in a solvent, possessing polarity, excelling in adhesiveness to an electrode and to a macromolecular solid electrolyte, and permitting effective formation of a coating on a large surface.

Another object of the present invention is to provide a method for the production of the electrochromic macromolecular substance mentioned above.

A further object of the present invention is to provide inexpensively a coloring-discoloring material using the electrochromic macromolecular substance mentioned above, which is free from such drawbacks as layer separation and consequent deficiency in coloration and discoloration and therefore particularly usable in an electrochromic display device.

To accomplish the objects described above, in accordance with the present invention, there is provided a novel electrochromic copolymer represented by the following general formula (1):

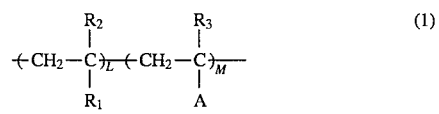

wherein $R_1$ represents a group based on a polymer or a copolymer possessing electroconductivity and inducing coloration or discoloration on being oxidized or reduced, $R_2$ and $R_3$ represent independently a hydrogen atom or an alkyl group having 1 to 1,000 carbon atoms, A represents a group possessing polarity and exhibiting affinity for ions, and L and M are independently an integer of at least 1, providing that the total degree of polymerization is an integer in the range of 10 to 12,000.

The copolymer mentioned above may be a block copolymer or a random copolymer and can be produced by copolymerizing an unsaturated compound having a chemical structure represented by the following general formula (2):

$$CH_2=\underset{R_1}{\overset{R_2}{C}} \qquad (2)$$

wherein $R_1$ represents a group based on a polymer or a copolymer possessing electroconductivity and inducing coloration or discoloration on being oxidized or reduced, $R_2$ represents a hydrogen atom or an alkyl group having 1 to 1,000 carbon atoms (hereinafter referred to briefly as "chromophoric group-containing monomer") with an unsaturated compound having a chemical structure represented by the following general formula (3):

$$CH_2=\underset{A}{\overset{R_3}{C}} \qquad (3)$$

wherein $R_3$ represents a hydrogen atom or an alkyl group having 1 to 1,000 carbon atoms and A represents a group possessing polarity and exhibiting affinity for ions (hereinafter referred to briefly as "compatible group-containing monomer").

The block copolymer is obtained by first polymerizing a chromophoric group-containing monomer represented by the general formula (2) mentioned above, adding a compatible group-containing monomer represented by the general formula (3) mentioned above to the resultant reaction system, and further polymerizing the resultant mixture. The random copolymer is obtained by mixing a chromophoric group-containing monomer represented by the general formula (2) mentioned above with a compatible group-containing monomer represented by the general formula (3) mentioned above and polymerizing the resultant mixture.

In accordance with the present invention, there are further provided a coloring-discoloring (or color extinction) material which contains a novel copolymer represented by the aforementioned general formula (1) and induces coloration or discoloration (or color extinction) by the oxidation or reduction of the copolymer and an electrochromic display device using the coloring-discoloring material.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
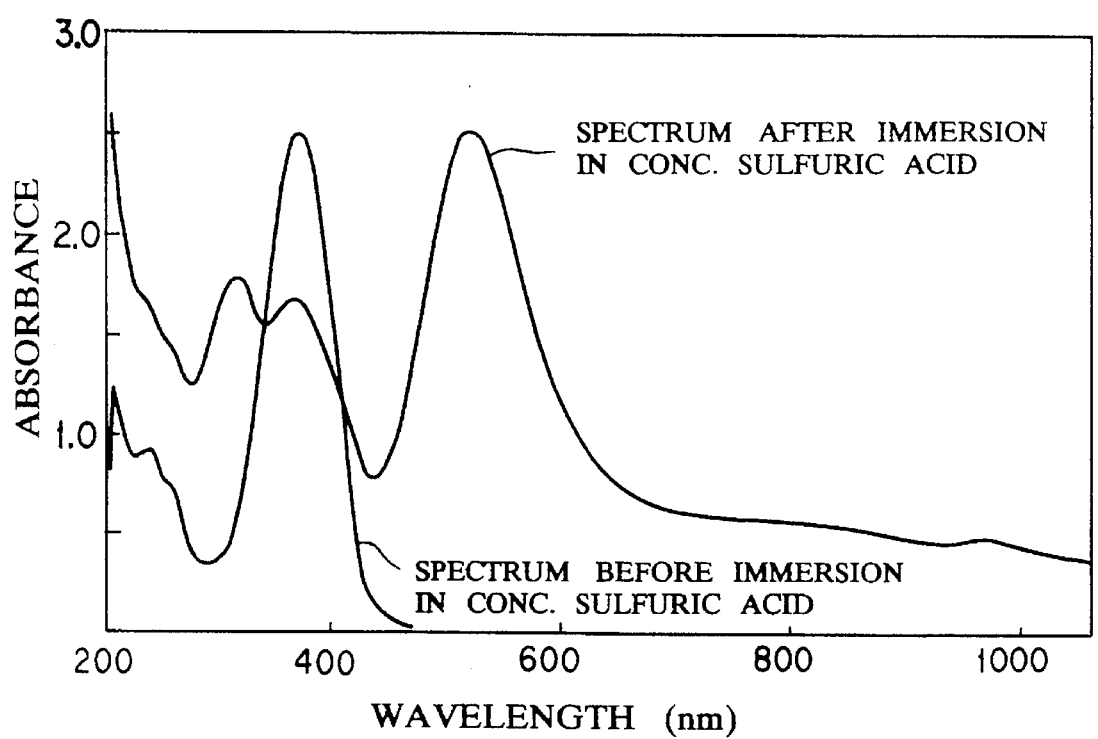
FIG. 1 is a graph showing a change in the absorption spectrum of an electrochromic copolymer film produced in Example 1 which will be cited hereinafter before and after immersion of the film in concentrated sulfuric acid.

The electrochromic substance according to the present invention is the copolymer of a chromophoric group-containing monomer having a chemical structure represented by the aforementioned general formula (2) containing a group based on a polymer or a copolymer possessing electroconductivity and inducing coloration or discoloration on being oxidized or reduced and a compatible group-containing monomer having a chemical structure represented by the aforementioned general formula (3) containing a group possessing polarity and exhibiting affinity for ions.

Since the novel copolymer which is obtained by the present invention is a copolymer of a compatible group-containing monomer of high polarity and a chromophoric group-containing monomer capable of functioning as a coloring material, it possesses high adhesiveness to a polar surface and exhibits strong adhesiveness. It further enjoys high affinity for an ion-conducting macromolecular substance and excels in adhesiveness to a macromolecular solid electrolyte. It is, therefore, free from such drawbacks as layer separation and consequent deficiency in coloration and discoloration which are entailed by the conventional coloring-discoloring materials. In addition, the copolymer itself possesses ionic conductivity.

The group which is contained in the chromophoric group-containing monomer and based on a polymer or a copolymer possessing electroconductivity and inducing coloration or aiscoloration on being oxidized or reduced is caused to produce inherent coloration or discoloration by an electrochemical oxidation-reduction. The electrochemical oxidation-reduction necessitates transfer of ions and causes coloration (or generation of color) and discoloration (or extinction of color) depending on the ion concentration. Since the novel copolymer according to the present invention possesses ionic conductivity and contains a chromophoric group capable of inducing inherent coloration or discoloration by the electrochemical oxidation-reduction, it functions as an ion-conducting chromophoric material and exhibits an outstanding chromophoric property.

As concrete examples of the group $R_1$ which is based on a polymer or a copolymer possessing electroconductivity and inducing coloration or discoloration in consequence of the oxidation or reduction thereof, conjugated aromatic polymers such as phenylene polymer, naphthalene polymer, anthracene polymer, and azulene polymer; conjugated heterocyclic polymers such as thiophene polymer, alkylthiophene polymer, selenophene polymer, pyrrole polymer, pyridine polymer, and furan polymer; hereto-atom-containing conjugated polymers such as aniline polymer; polymers having a π electron conjugated group such as ferrocene and phthalocyanine in the side chain thereof; combinations thereof; modifications thereof obtained by introducing an alkyl group or a similar thereinto as a side chain thereof such as 3-alkyl thiophene polymer; and modifications thereof obtained by introducing an alkyl group into the terminal thereof may be cited. The introduction of an alkyl group into any position of the nucleus of the polymer mentioned above excluding the position attached to a vinyl group is effective for improving the solubility of a chromophoric group-containing monomer in a solvent and makes the subsequent treatment thereof easy. These substances are caused to manifest their inherent coloration and discoloration in consequence of the electrochemical oxidation-reduction. The term "polymer" as used herein is to be construed as including oligomers.

As the chromophoric group-containing monomers mentioned above, the chemical structures represented by the following four general formulas may be cited:

$$CH_2=\underset{R_1}{\overset{}{CH}} \qquad (A)$$

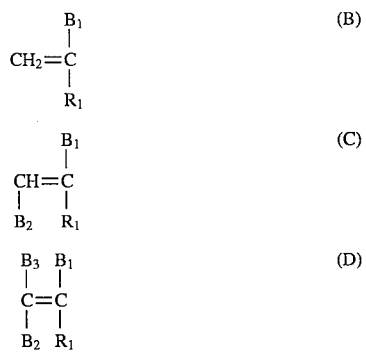

wherein $R_1$ represents a group based on a polymer or a copolymer possessing electroconductivity and inducing coloration or discoloration on being oxidized or reduced and $B_1$, $B_2$, and $B_3$ represent independently a substituent.

Of these chromophoric group-containing monomers, the α,β-2 substituted compounds, i.e. the compounds of the general formulas (C) and (D), are deficient in polymerizability and are polymerized to a desired degree of macromolecularity only with difficulty. The compounds which logically constitute themselves sources of the group $R_1$ based on a polymer or a copolymer possessing electroconductivity and inducing coloration or discoloration by the oxidation or reduction thereof are generally such that their solubility in a solvent decreases in proportion as their degrees of polymerization increase. As a result, the chromophoric group-containing monomer which results from the combination with such a compound manifests low solubility in a solvent and undergoes a polymerization reaction only with difficulty. The influence of this behavior of solubility will be conspicuous particularly in the compounds of the chemical structure of (A). The compounds of the chemical structure of (B) secure solubility by virtue of the substituent $B_1$ and acquire polymerizability. As the chromophoric group-containing monomer for use in the present invention, therefore, the compounds of the aforementioned chemical formula of (B) are most desirable.

The groups which possess polarity and exhibit affinity for ions and, therefore, fit the compatible group-containing monomers mentioned above include hydroxyl group, carboxyl group, thiocarboxyl group, sulfonic group, sulfinic group, sulfenic group, nitrile group, aldehyde group, thioaldehyde group, amino group, imino group, mercapto group, esterified groups thereof, and amidated groups thereof, for example.

As the compatible group-containing monomers, similarly to the aforementioned chromophoric group-containing monomers, the chemical structures represented by the following four general formulas may be cited:

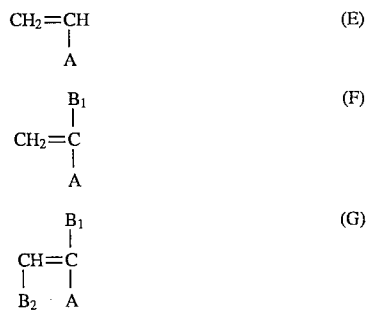

wherein A represents a group possessing polarity and exhibiting affinity for ions and $B_1$, $B_2$, and $B_3$ represent independently a substituent.

Of the compounds of the chemical structures cited above, those of the general formulas (G) and (H) produce polymers only with difficulty because they have poor ability to polymerize similarly to the case of the chromophoric group-containing momomers. In the present invention, the compounds of the general formulas (E) and (F) are effectively usable. In the case of compounds of the general formula of (E), since they strongly manifest the quality of the group A possessing polarity and exhibiting affinity for ions, it will be at times difficult to find a solvent which has strong polarity and is capable of simultaneously solving a chromophoric group-containing monomer and a compatible group-containing monomer. In the case of the compounds of the general formula of (F), since their solubility is variable with the particular kind of the substituent $B_1$, a solvent capable of simultaneously solving a chromophoric group-containing monomer and a compatible group-containing monomer can be secured.

The substituents of a chromophoric group-containing monomer and a compatible group-containing monomer should be saturated alkyl groups so as to preclude the otherwise possible occurrence of cross-linkage in the process of polymerization. The sizes of these saturated alkyl groups are only required to be such that the corresponding monomers are soluble in a solvent. Thus, the alkyl groups are such that their numbers of carbon atoms are in the range of 1 to 1,000. If the molecular weight of the pendant alkyl group of the monomer is too high, however, the reactivity thereof will be degraded and the time required for the coloration or discoloration of the resultant electrochromic substance will be prolonged. Thus, the pendant alkyl group ($R_2$ or $R_3$) of each of the chromophoric group-containing monomer and the compatible group-containing monomer is desired to have 1 to 50 carbon atoms. To secure the sufficient solubility in a solvent and the suitable time required for the coloration or discoloration of the electrochromic substance as required in commercial use, the pendant alkyl group is particularly desired to have 1 to 25 carbon atoms.

When the group possessing polarity and exhibiting affinity for ions happens to have so strong polarity as to inhibit a polymerization reaction, when no existing solvent is capable of simultaneously solving a chromophoric group-containing monomer and a compatible group-containing monomer, or when the relevant monomers are not stable, for example, the group possessing polarity and exhibiting affinity for ions is enabled to secure reactivity, solubility, and stability as required by having this group esterified or amidated in advance of polymerization. The ester or amide can be decomposed by hydrolysis after the polymerization.

The chromophoric group-containing monomer and the compatible group-containing monomer described above can be easily polymerized in a suitable solvent by the use of a polymerization initiator, for example, peroxides such as benzoyl peroxide and azo compounds such as azobisisobutyronitrile.

In the production of a block copolymer, a block copolymer having a chromophoric group-containing monomer and a compatible group-containing monomer severally polymerized in the form of a block is obtained by first polymerizing the chromophoric group-containing monomer alone, then adding the compatible group-containing monomer to the produced polymer, and further effecting polymerization of the resultant mixture. In the production of a random copolymer, a random copolymer those configuration is determined by the reactivity and selectivity of each of the to monomers involved is obtained by first mixing the chomophoric group-containing monomer with the compatible group-containing monomer and then subjecting the resultant mixture to polymerization.

Though the proportion of the chromophoric group-containing monomer to the copolymer is not particularly limited, it is desired to fall in the range of 0.1 to 30% by molar ratio. That is, the molar ratio of the chromophoric group-containing monomer to the compatible group-containing monomer is within the range of 0.1: 99.9 to 30: 70. When the copolymer has an unduly high content of the chromophoric group-containing monomer, it is at a disadvantage in sacrificing adhesiveness and film strength to a great extent. This disadvantage will increase particularly when the group based on a polymer or a copolymer possessing electroconductivity and inducing coloration or discoloration on being oxidized or reduced assumes an unduly large proportion. To secure the electroconductivity, however, the proportion of the chromophoric group-containing monomer to the copolymer is desired to be as high as possible. When the copolymer has a low content of the chromophoric group-containing monomer, a long period is required for the coloration of the electrochromic substance. As for the solubility of the copolymer in a solvent, it is desired that the copolymer has a high content of the compatible group-containing monomer. Particularly, when the copolymer contains vinyl acetate, it may dissolve in various solvents. Thus, the preferred proportion of the chromophoric group-containing monomer to the copolymer is within the range of 20 to 30% by molar ratio.

Though the total degree of polymerization of the copolymer is not particularly limited, it is desired to be in the range of 10 to 12,000 in consideration of ease of reaction, solubility in a solvent, and strength of the film to be formed of the copolymer. If the degree of polymerization is too high, the polymer solution will be applied to a substrate only with difficulty because the solubility of the copolymer in a solvent is lowered and the viscosity of the resultant solution inevitably increases. To obtain the copolymer excelling in solubility and application properties and secure the sufficient strength of the film to be formed of the copolymer as the electrochromic material, the degree of polymerization is desired to be in the range of 20 to 1,500, preferably 20 to 250.

In general, the chromophoric group-containing monomer is soluble in a non-polar solvent and, therefore, may be polymerized in the non-polar solvent such as toluene, benzene, and tetrahydrofuran. As for the compatible group-containing monomer, vinyl acetate, methyl methacrylate, etc. are soluble in toluene, benzene, tetrahydrofuran, and the like. In the polymerization of the copolymer according to the present invention, the solvent capable of dissolving both the chromophoric group-containing monomer and the compatible group-containing monomer therein may be used. The produced copolymer is soluble in these solvents. In case the compatible group (A) of the copolymer is hydroxyl group or carboxyl group, the copolymer is soluble in a polar solvent such as dimethyl formamide and dimethyl sulfoxide. Further, the copolymer containing vinyl acetate exhibits solubility in a commonly used solvent such as acetone, too.

The copolymer of the present invention which is obtained as described above allows production of a film by any of the conventional methods. When the group possessing polarity and exhibiting affinity for ions happens to be a hydroxyl group, for example, in the same manner as the preparation of the film of polyvinyl alcohol, the copolymer allows production of this film by a method which comprises dissolving this copolymer in a suitable solvent thereby preparing a solution, for example, a dimethyl sulfoxide solution containing the copolymer at a concentration in the range of 0.1 to 5%, casting the solution on a glass plate, and drying the resultant layer of the solution at a temperature in the neighborhood of 70° C. under a reduced pressure for about 10 hours.

As mentioned above, since the novel copolymer according to the present invention is excellent in the ability of coloration-discoloration and in the adhesive strength manifested to an electrode and a macromolecular solid electrolyte and, at the same time, soluble in a solvent, it allows manufacture of a film on a large surface as by the casting technique. It, therefore, constitutes itself a highly practical and advantageous material for electrochromic display devices.

It is well known in the art that the electrochromic display device essentially comprises a transparent electrode, a counter electrode, and an electrochromic substance and an electrolyte solution or solid electrolyte both interposed between the transparent electrode and the counter electrode. ITO (indium tin oxide) may be advantageously used as the transparent electrode and as the counter electrode. When the transparency is not required for the counter electrode, such an electrode as metal or carbon electrode which is commonly used in electrochemical devices may be used as the counter electrode. As a supporting electrolyte for accelerating coloration and discoloration of the electrochromic substance, ionizing salts which exhibit good solubility in a solution or solid electrolyte to be used as a carrier thereof and contain an anton exhibiting the electron releasing property to such an extent that the coloration of the chromophoric group is secured may be used. Examples of supporting electrolytes which are usable in the present invention include, but are not limited to: $LiClO_4$, $KClO_4$, $NAClO_4$, $LiBF_4$, $KBF_4$, $NaBF_4$, $LiAsF_6$, $KAsF_6$, and $NaAsF_6$. Examples of solid electrolytes which are usable in the present invention include, but are not limited to: polyethylene oxide, macromolecular polyethylene glycol, polyvinyl alcohol, and gel of propylene carbonate.

Now, the present invention will be described specifically below with reference to working examples.

EXAMPLE 1

A vinyl monomer having a trimer of thiophene as a chromophoric group thereof was synthesized in accordance with the method disclosed in published Japanese Patent Application, KOKAI No. HEI 4-108784. In 5 ml of benzene, 0.15 g of the resultant vinyl monomer and 0.01 g of azobisisobutyronitrile were stirred at 60° C. for 24 hours and the resultant mixture and 4.5 g of vinyl acetate monomer added thereto were together subjected to polymerization for 24 hours. Benzene was removed from the polymerization product under reduced pressure. The block copolymer thus deprived of the solvent was dissolved in methanol and the solution was cast on a glass plate to form a film. The film consequently obtained assumed a light yellow color and exhibited good adhesiveness to glass. When the film as held fast on the glass plate was immersed in concentrated sulfuric acid, the color of the film changed to a red color. The change in a visible ultraviolet spectrum of the produced copolymer film before and after immersion in the concentrated sulfuric acid is shown in FIG. 1.

EXAMPLE 2

A vinyl monomer having a trimer of thiophene as a chromophoric group thereof was synthesized in accordance with the method disclosed in published Japanese Patent Application, KOKAI No. HEI 4-108784. In 5 ml of benzene, 0.15 g of the resultant vinyl monomer, 4.5 g of vinyl acetate monomer, and 0.01 g of azobisisobutyronitrile were stirred for polymerization at 60° C. for 48 hours. Benzene was removed from the polymerization product under reduced pressure. The copolymer deprived of the solvent was dissolved in 250 ml of methanol. The resultant solution was saponified by being stirred at room temperature for 24 hours in conjunction with 6.3 ml of an aqueous 40% sodium hydroxide solution. The obtained saponification product was found by the infrared spectrum thereof to have a saponification ratio of about 100%. The copolymer thus produced was dissolved in dimethyl sulfoxide and the solution was cast on an ITO (indium tin oxide) glass plate to form a film. The produced film assumed a light yellow color and showed good adhesiveness to the ITO glass. When the ITO glass (transparent electrode) having the polymer film deposited thereon was subjected to a doping treatment by being opposed to a counter electrode made of platinum in an electrolytic solution (containing lithium perchlorate/propylene carbonate in a concentration of 0.1 mol per liter) and exposed to a potential of +2 V, the polymer film assumed a red color. When the polymer was dedoped by inverting the potential to −2 V, it resumed the light yellow color. As the result of the determination of a visible ultraviolet spectrum of the produced polymer, it was found to exhibit a similar spectrum to that of FIG. 1.

EXAMPLE 3

0.405 g of magnesium and 5.00 g of 4-bromo-4'-n-pentyl biphenyl were introduced into a flask containing 20 ml of tetrahydrofuran and the mixture was stirred until magnesium disappeared. The resultant solution kept at 0° C. was gradually added dropwise to a solution obtained by stirring and dispersing 2.51 g of 4-chloro-alpha-methyl styrene and 0.072 g of dichloro-1,3-bis (diphenylphosphinopropane) nickel (II) in 15 ml of tetrahydrofuran. The mixture was stirred at 35° C. for two and a half hours and at room temperature for 13 hours. Thereafter, 400 ml of 1N hydrochloric acid was added dropwise to the mixture and the mixture was further stirred for one hour to continue the reaction. At the termination of the reaction the mixture was washed with water and subjected to a filtration and subsequent extraction with diethyl ether to separate the object; a vinyl monomer having a trimer of phenylene as a chromophoric group.

Figure 2:
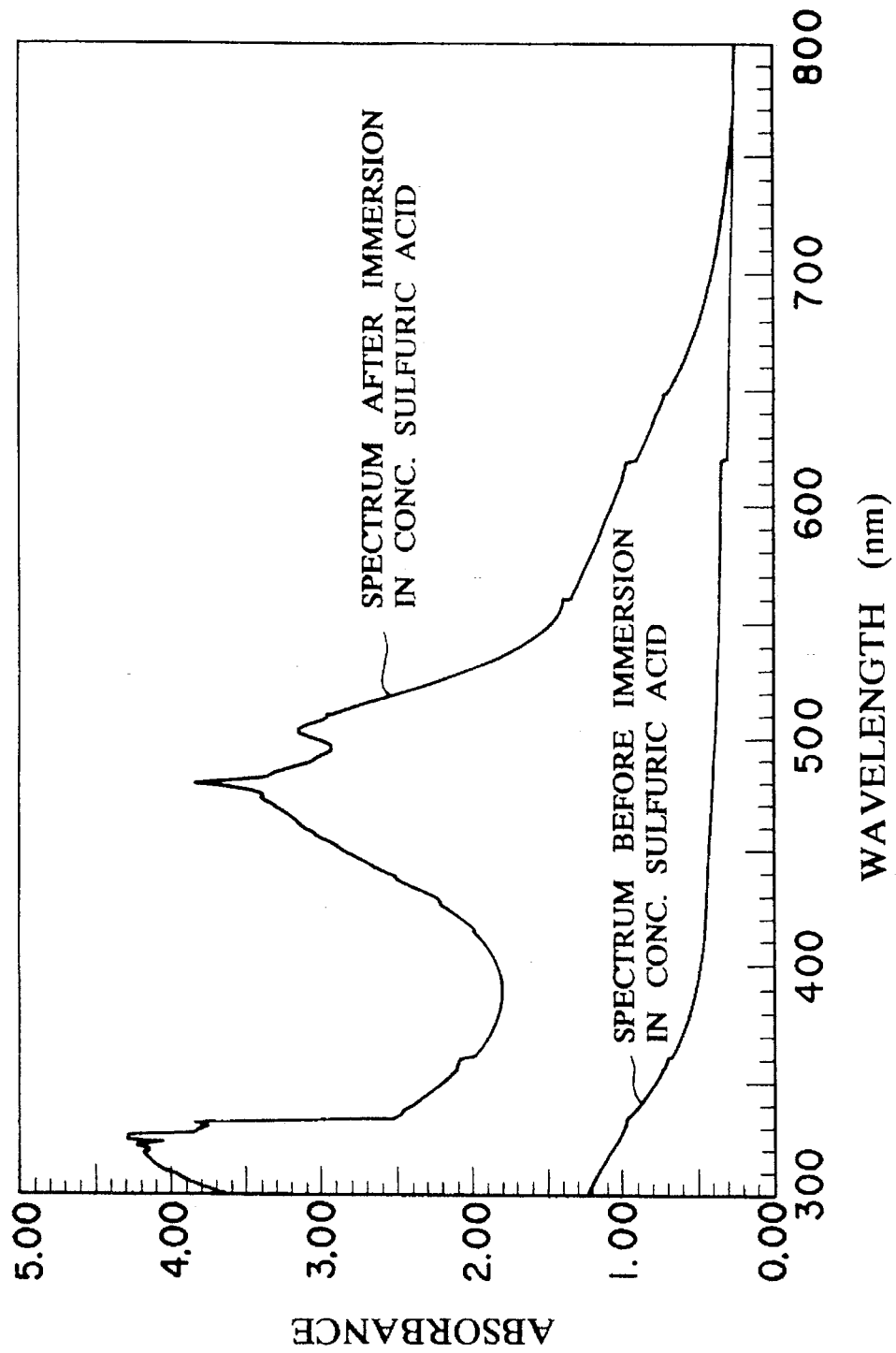
FIG. 2 is a graph showing a change in the absorption spectrum of an electrochromic copolymer film produced in Example 3 which will be cited hereinafter before and after immersion of the film in concentrated sulfuric acid.

In 4 ml of toluene, 0.5 g of the resultant vinyl monomer, 2.5 g of vinyl acetate monomer, and 0.058 g of azobisisobutyronitrile were stirred at 90° C. for 35 hours to effect polymerization. The polymerization product was purified by reprecipitation from hexane to obtain a random copolymer. The purified random copolymer was dissolved in toluene and the solution was cast on a glass plate to form a film. The produced film assumed a yellowish white color and exhibited good adhesiveness to glass. When the film as held fast on the glass plate was immersed in concentrated sulfuric acid, the color of the film changed to a red color. The change in color of the film was reversible. When the film was immersed in ammonia water, its color was reverted to the original color. The change in a visible ultraviolet spectrum of the produced copolymer film before and after immersion in the concentrated sulfuric acid is shown in FIG. 2.

EXAMPLE 4

A vinyl monomer having a trimer of phenylene as a chromophoric group was prepared in the same manner as in Example 3.

In 4 ml of toluene, 0.5 g of the resultant vinyl monomer and 0.058 g of azobisisobutyronitrile were stirred at 90° C. for 20 hours and the resultant mixture and 2.5 g of vinyl acetate monomer added thereto were together subjected to further polymerization for 15 hours. The polymerization product was purified by reprecipitation from hexane to obtain a block copolymer. The obtained block copolymer was dissolved in 250 ml of methanol, 0.5 ml of aqueous 20% sodium hydroxide solution was added thereto, and the mixture was stirred at room temperature for one hour. The mixture and an equal weight of hydrochloric acid added thereto were together added dropwise to ice-water and the precipitate was washed with water. The obtained copolymer was dissolved in methanol and the solution was cast on a glass plate to form a film. The produced film assumed a yellowish white color and exhibited good adhesiveness to glass. When the film as held fast on the glass plate was immersed in concentrated sulfuric acid, the color of the film changed to a red color. The change in color of the film was reversible. When the film was immersed in ammonia water, its color was reverted to the original color. The change in a visible ultraviolet spectrum of the produced copolymer film before and after immersion in the concentrated sulfuric acid was same as that of FIG. 2.

EXAMPLE 5

A vinyl monomer having a trimer of phenylene as a chromophoric group was prepared in the same manner as in Example 3.

In 4 ml of toluene, 0.5 g of the resultant vinyl monomer and 0.058 g of azobisisobutyronitrile were stirred at 90° C. for 20 hours and the resultant mixture and 2.5 g of vinyl acetate monomer added thereto were together subjected to further polymerization for 15 hours. The polymerization product was purified by reprecipitation from hexane to obtain a block copolymer. The obtained block copolymer was dissolved in 250 ml of methanol, 6 ml of aqueous 40% sodium hydroxide solution was added thereto, and the mixture was stirred at room temperature for 24 hours. The mixture and an equal weight of hydrochloric acid added thereto were together added dropwise to ice-water and the precipitate was washed with water. The obtained copolymer was dissolved in methanol and the solution was cast on a glass plate to form a film. The produced film assumed a yellowish white color and exhibited good adhesiveness to glass. When the film as held fast on the glass plate was immersed in concentrated sulfuric acid, the color of the film changed to a red color. The change in color of the film was reversible. When the film was immersed in ammonia water, its color was reverted to the original color. The change in a visible ultraviolet spectrum of the produced copolymer film before and after immersion in the concentrated sulfuric acid was same as that of FIG. 2.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by foregoing description and all changes which come within the meaning and range of equivalency of the claims are, therefore, intended to be embraced therein.

What is claimed is:

1. A copolymer which exhibits electrochromism and is represented by either one of the following formulas (1a) and (1b):

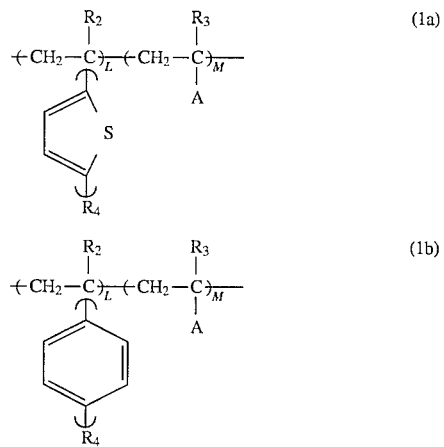

wherein $R_2$, $R_3$ and $R_4$ represent independently a hydrogen atom or an alkyl group having 1 to 1,000 carbon atoms, A represents a hydroxyl group or an acetylated hydroxyl group, and L, M and N are independently an integer of at least 1, providing that the total degree of polymerization is an integer in the range of 10 to 12,000, and a ratio of L/L+M in said general formulas (1a) and (1b) is within the range of 0.1 to 30% by molar ratio.

2. A copolymer according to claim 1, which is a copolymer of a vinyl monomer having a thiophene oligomer in the side chain thereof and a vinyl acetate monomer.

3. A copolymer according to claim 1, which is a saponification product of a copolymer of a vinyl monomer having a thiophene oligomer in the side chain thereof and a vinyl acetate monomer.

4. A copolymer according to claim 1, which is a copolymer of a vinyl monomer having a phenylene oligomer in the side chain thereof and a vinyl acetate monomer.

5. A copolymer according to claim 1, which is a saponification product of a copolymer of a vinyl monomer having a phenylene oligomer in the side chain thereof and a vinyl acetate monomer.

6. A copolymer according to claim 1, wherein the total degree of polymerization is within the range of 20 to 1,500.

7. A copolymer according to claim 1, wherein said groups $R_2$, $R_3$ and $R_4$ of the general formulas (1a) and (1b) are independently a hydrogen atom or an alkyl group having 1 to 25 carbon atoms.

8. A copolymer which exhibits electrochromism comprising:

a solution polymerized copolymer selected from copolymers of the formula:

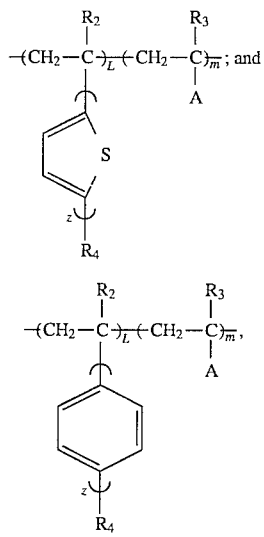

wherein $R_2$, $R_3$ and $R_4$ independently represent a hydrogen atom or an alkyl group having 1 to 1,000 carbon atoms, A represents a hydroxyl group or an acetylated hydroxyl group, and L, M and N independently are integers of at least 1, the total degree of polymerization being an integer of from 10 to 12,000 and the molar ratio of L/L+M being from 0.1 to 30%.

* * * * *